F. FARMER.
LAWN MOWER.
APPLICATION FILED AUG. 29, 1913.
1,122,709.
Patented Dec. 29, 1914.
2 SHEETS—SHEET 1.
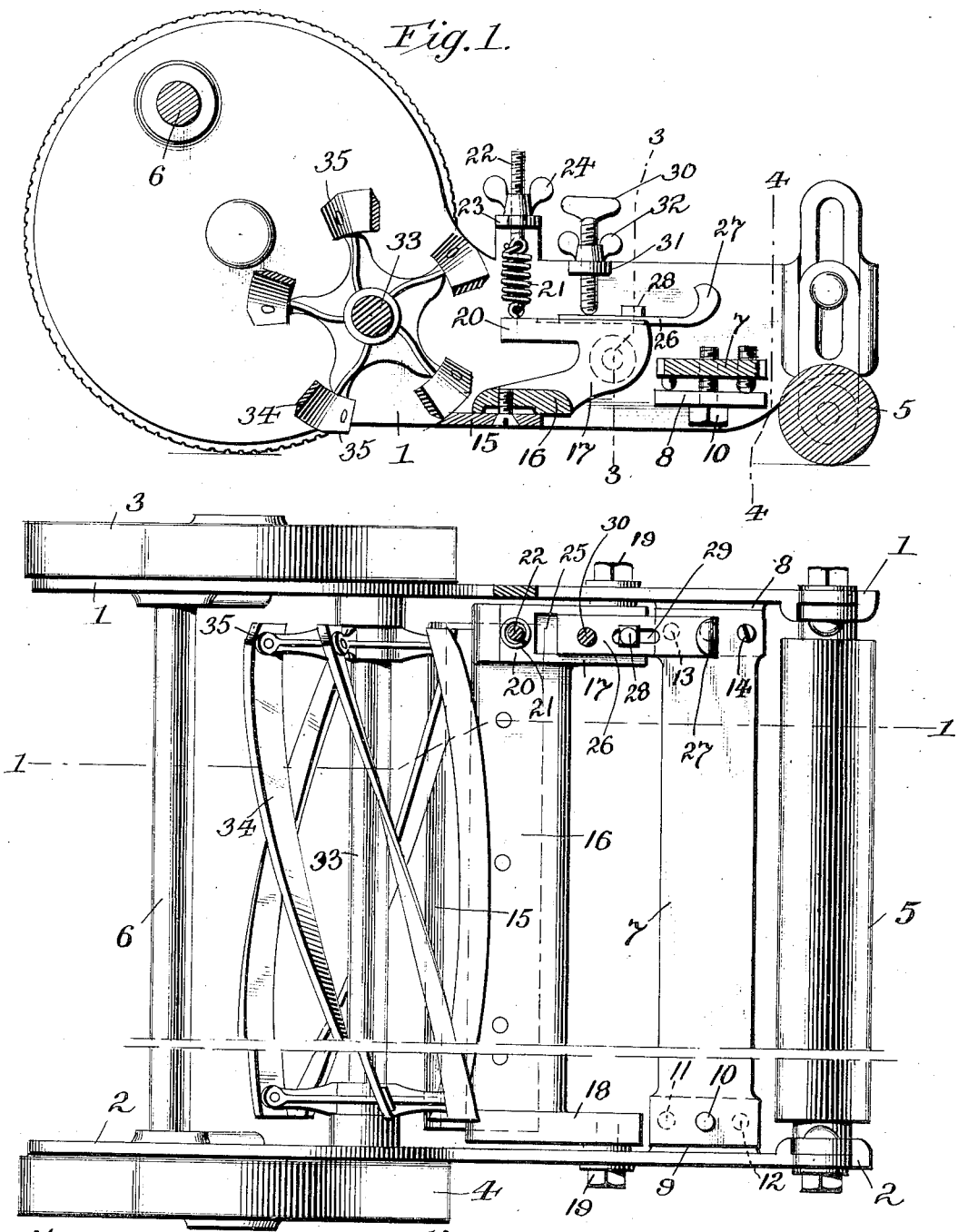

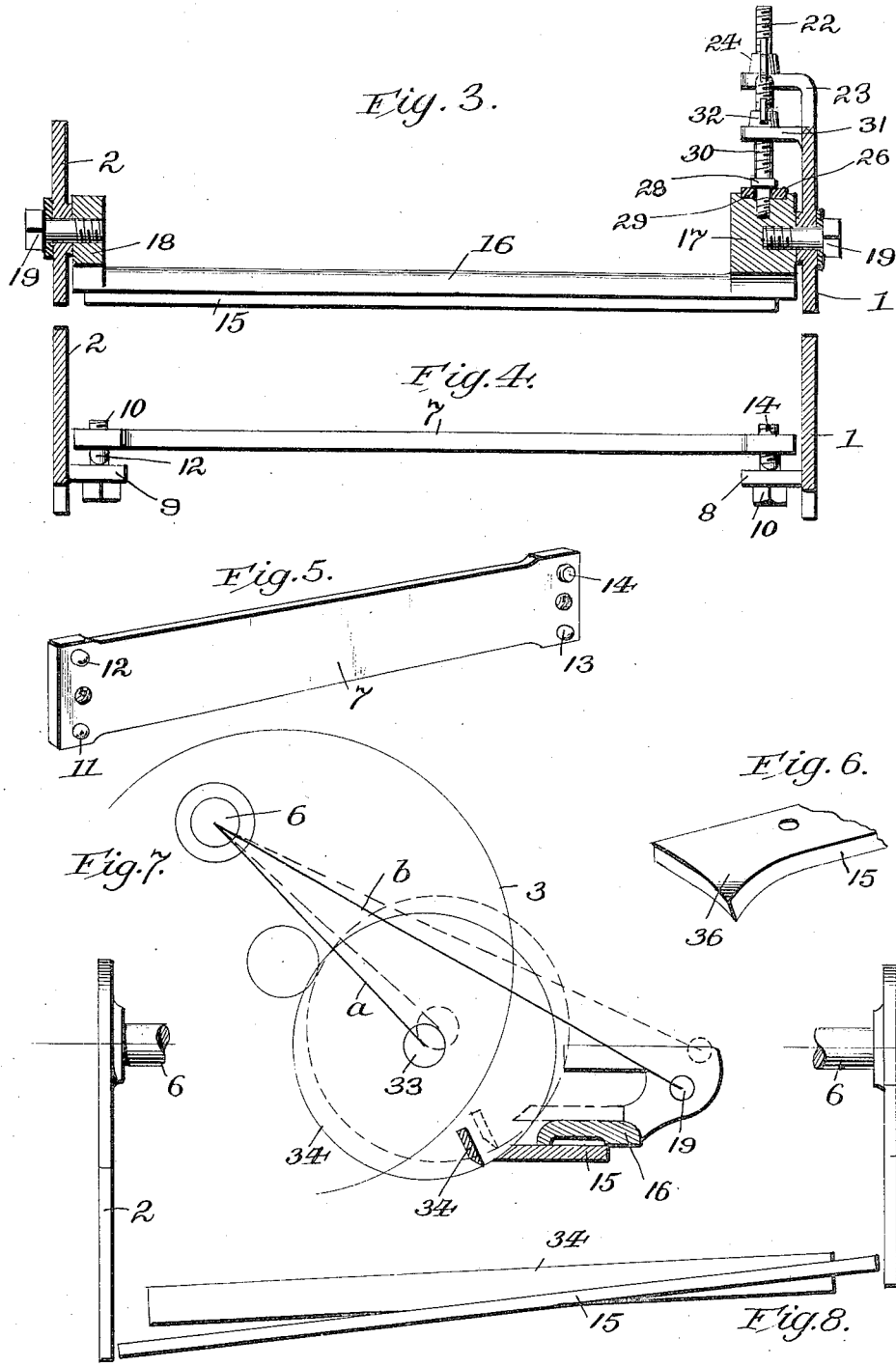

UNITED STATES PATENT OFFICE.

FRANK FARMER, OF CHICAGO, ILLINOIS, ASSIGNOR OF ONE-HALF TO ROBERT E. FARMER, OF NEW YORK, N. Y.

LAWN-MOWER.

1,122,709.   Specification of Letters Patent.   Patented Dec. 29, 1914.

Application filed August 29, 1913. Serial No. 787,326.

*To all whom it may concern:*

Be it known that I, FRANK FARMER, a citizen of the United States, residing at Chicago, in the county of Cook and State of Illinois, have invented certain new and useful Improvements in Lawn-Mowers, of which the following is a specification.

My present invention pertains to improvements in lawn-mowers.

The main object of the invention resides in the provision of means for bringing the cutting edge of the cutter-bar into perfect alinement with the blades of the reel and permanently maintaining such alinement by rigidly locking the frame of the mower in a fixed position when the alinement has been attained.

A further object of the invention is to provide means whereby the cutter-bar is held up to the reel so that the cutter-bar will yield when subjected to undue strain.

Another object of the invention is to provide means for adjusting said cutter-bar toward and from the reel, independently of the adjustment of the frame.

A still further object of the invention is to provide an indicator in connection with the cutter-bar adjusting mechanism, whereby one may readily determine when the proper adjustment is effected between the reel and the blade.

Another object of the invention is to form the entering portions of the blades of the reel and the coacting cutter-bar so that should the parts be thrown out of proper adjustment by any cause, the blades will nevertheless pass into operative relation, and the reel be permitted to rotate, thus freeing the machine from strain which inheres when the reel is suddenly stopped, as in mowers of the present type.

With these and other objects in view, reference will be had to the annexed drawings, wherein:

Figure 1 is a vertical sectional view of the machine; Fig. 2 a top plan view thereof, certain details of the adjusting mechanism being omitted or broken away; Fig. 3 a transverse vertical sectional view, taken on the line 3—3 of Fig. 1; Fig. 4 a similar view, taken on the line 4—4 of Fig. 1; Fig. 5 a perspective view of the adjustable frame connecting bar as seen from the under side; Fig. 6 a detail view of one end of the cutter-bar showing a modification of the invention over that illustrated in Fig. 2; Figs. 7 and 8 diagrammatic views illustrative of the relation between the frame of the mower and the cutter-bar, and reel blades, the parts being shown as thrown out of position in Fig. 8 and somewhat accentuated.

In the drawings, 1 and 2 represent, respectively, the main side frames of the mower, and 3 and 4 the forward supporting and driving wheels. Between the rear ends of the frames there is adjustably mounted a supporting roller 5, these parts being of the usual or any preferred construction.

Extending across between frames 1 and 2 at the upper forward portion thereof, is a cross tie bar or rod 6, which rod, as is usual, serves to space the frames and to hold them in place.

Ordinarily the cutter bar has been employed to secure the frames in rear of the cutter reel, but with the present construction the cutter-bar is not depended upon to effect such result, and an independent bar, 7, is employed. Said bar is shown in detail in Fig. 5, and is of a length to extend across between the side frames, the ends thereof overlying lugs or brackets 8 and 9, extending inwardly, respectively, from the frames 1 and 2, and to which it is connected by cap screws 10.

Bar 7, which may be termed the alining bar, is provided on its under face adjacent one end, with two rigid teats or lugs 11 and 12, and at its opposite end with a similar member 13. An adjusting and locking screw 14 is also mounted in the bar at such end and as will be noted lugs 11 and 12 are located upon opposite sides of the screw holes into which the cap screws 10 pass, and lug 13 and screw 14 occupy the same relation at the opposite end; in other words, said members are spaced apart in pairs upon opposite sides of the median line of the alining bar 7, and bear, respectively, upon the brackets 8 and 9.

The cutter bar is preferably of the spring-sustained type; that is, it is held up to the reel by a spring the tension of which is preferably adjustable, so that the mower may be set to operate upon various grades or growths of grass.

Under the present preferred construction the cutter bar, designated by 15, is secured to and carried by a rocking frame, comprising a cross-bar or member 16, and arms 17 and 18 extending rearwardly and upwardly therefrom, said arms being secured between the frames 1 and 2 by means of screws 19 which are journaled in said frames.

An arm or lever 20 extends forwardly from the upper portion of arm 17, a spring 21 being connected thereto and at its opposite end to the lower end of threaded stem 22 which passes loosely through an overhanging bracket 23, carried by frame 1. A wing nut 24, is mounted upon said stem and serves as a means of adjustment for the stem and consequently the spring.

Arm 20 is provided in its upper face with a socket or recess 25, in which is seated an indicator, comprising a slide 26 provided at its rear end with a handle or finger-piece 27, the slide being held in the socket by a screw 28, which freely passes through an elongated slot 29 formed therein. The lower end of a stop screw 30 overlies slide 26, said screw being mounted in a bracket 31 and held in its adjusted position by a wing nut 32.

The reel, secured to the reel shaft 33, may be of any approved type, but preferably the knives or blades 34 at their advance or entering end will be somewhat cut away or beveled, as at 35, to facilitate the passage of the blade into cutting relation with the cutter-bar. If preferred, the cutter-bar at its initial cutting or entering end may be downwardly inclined or deflected, as at 36, Fig. 6, in which case the reel blades will be of the usual type.

In the adjustment of the mower, the frames 1 and 2 swing up or down about the cross rod 6 as a center, and the radius of movement of the reel center and the cutter-bar-supporting frame is indicated in Fig. 7 by the radius lines $a$ and $b$, respectively. The correct adjustment is shown in full lines in said figure, and a distorted position in dotted lines; the cutter bar being more remote from the center 6, it will have a greater range or amplitude of movement than the reel. By adjusting the frames up or down, as the case may be, about the rod 6, the cutter bar will be moved from its improper position (as in Fig. 8, where such incorrect position is shown somewhat exaggerated) and caused to assume a perfect alinement with the reel blades throughout its entire length, and such adjustment, when once secured, is maintained by locking the alining bar 7 in position. Said bar, while the reel blades and cutter bar are being brought to adjustment, is free to rock with reference to brackets 8 and 9 upon its three fixed lugs 11, 12 and 13, and when the proper alinement between the blades and cutter-bar is secured, screw 14 is turned home firmly against the underlying bracket 8, thus locking the parts against relative movement under ordinary usage and handling conditions.

The adjustment of the parts may be stated in another way, namely: When the side frames have been shifted so that the reel-blades and cutter bar approximately aline, the final adjustment may be secured by the screw 14, and bolts 10 screwed home to lock the parts in place. Thus, by the use of bar 7 an operation which now demands the employment of a skilled mechanic may be accomplished by an ordinary workman, and that with ease. Should the parts be thrown out of adjustment by undue jar or impact, as frequently occurs in shipment, they may be readily readjusted and this without reshipment to the factory where the skilled assembler is employed.

While the alinement feature is essential when employed in conjunction with a cutter-bar mounting of the type herein set forth, the invention from a generic standpoint is not so limited. When once the initial adjustment of the cutter-bar and reel blades is effected and the frames locked together, the secondary or tension adjustment of the cutter-bar will be made. This is effected in the following manner.

A slight tension is put upon the spring 21 by screwing down the wing nut 24, which has the effect of elevating the arm 20 and bringing the indicator slide 26 against the stop-screw 30. A reel-blade is then brought into cutting position with reference to the cutter-bar 15, and the combined stop and adjusting screw is then advanced or backed (whichever direction is necessary) until the cutter-bar rests against the reel blade and the stress of the spring 21 acts to draw the cutter-bar into contact with the reel blade. When this adjustment is effected, the lower end of the stop screw 30 will be just out of contact with the indicator slide 26, and as soon as the slide is loose so that it may be moved back and forth under the stop screw, one knows that the stop screw has been properly adjusted, so that the tension of the spring has caused the blades to come into cutting contact. The reel blade should be moved across the cutter-bar and the indicator slide moved back and forth at the same time. If the blades are perfectly true, the slide will be free to move throughout the entire movement of the reel blade over the cutter-bar, but should there be any inequality in the reel blade or the cutter-bar, then the indicator slide will show this and the blade may be re-dressed; or if this be not possible, the stop screw 30 should be backed up sufficiently to release the indicator slide 26; then the operator will know that the tension of the spring has brought the blades into cutting contact at the point of inequality, and that every part of the blades will be subject to the tension of the spring. Under working conditions the slide is out of contact with the stop screw when one of the reel blades is in contact with the cutter-bar, though, of course, if the reel blades do not overlap on the cutter-bar the cutter-bar would momentarily be raised during the passage of one reel-blade from the bar to the entrance of the next reel blade into contact therewith, at which moment the stop screw 30 would hold the cutter-bar frame from being thrown upwardly into an abnormal position by the spring 21, The tension of the spring and consequently the degree of pressure exerted between the cutter bar 15 and the reel blades, may be varied to suit different requirements. Some grass is much tougher than others, and of necessity the tension at such time would have to be greater than where short, delicate grass is being mowed. The yielding of the cutter-bar, moreover, prevents injury to the machine when it strikes an obstruction, as frequently happens. The forcing of any hard material by the reel blades against the cutter-bar will not injure the machine, as the cutter-bar is free to move downwardly away from the reel blade, and to thus free itself of the foreign material.

Having thus described my invention, what I claim is:

1. In a mower, the combination of side frames; a tie rod connecting said frames at their forward portions; a knife reel mounted between said frames; a cutter bar coacting with said reel; and means independent of said bar for securing adjustment of the frames and consequent relative adjustment of the bar and reel knives.

2. In a mower, the combination of side frames; a tie rod connecting said frames at their forward portions; a knife reel mounted between said frames; a cutter bar coacting with the knives of said reel; and means for shifting said frames relatively to each other and securing them against movement when once the desired adjustment is effected.

3. In a mower, the combination of side frames; a tie rod connecting said frames at their forward portions; a knife reel mounted between said frames; a cutter bar coacting with the knives of said reel; a bar having a rocking connection at its ends with said frames; and means for rocking the bar and consequently the frames and securing the same in their adjusted relation.

4. In a mower, the combination of side frames; a tire rod connecting said frames at their forward portions; a knife reel carried by said frames; a rocking, spring-sustained cutter bar carried by the frames and coacting with the knives of said reel; and means independent of the tie-rod for securing adjustment of the frames and consequent relative adjustment of the cutter bar and reel knives.

5. In a mower, the combination of side frames; a tie rod connecting said frames at their forward portions; a knife reel carried by said frames; a cutter bar also supported by said frames; a bracket extending from each frame at a point in rear of the cutter bar; a bar connected at its ends to said brackets; and means carried by said bar and coacting with the brackets to produce a relative vertical adjustment of the frames about the tie rod as a center.

6. In a mower, the combination of a pair of side frames; a tie rod connecting said frames at their forward portions; a knife reel carried by the frames; a cutter bar also supported by said frames; a bracket extending from each frame at a point in rear of the cutter bar; an alining bar secured at its ends to said brackets; a pair of fixed lugs extending from one end of said bar and resting on the adjacent bracket; a lug extending from the other end of the bar and bearing upon the adjacent bracket; and a screw mounted in the bar adjacent said last-mentioned lug and likewise bearing at one end on the bracket.

7. In a mower, the combination of a frame; a knife reel carried thereby; a cutter-bar pivotally mounted to swing toward and from the reel; a spring urging the bar toward the reel; means for adjusting said spring; and means for indicating the extent of such adjustment and consequently the degree of friction existing between the reel knives and the cutter-bar.

8. In a mower, the combination of a frame; a knife reel carried thereby; a cutter-bar pivotally mounted to swing toward and from the reel; a spring urging the bar toward the reel; means for adjusting the tension of said spring; a stop for limiting the movement of the cutter-bar toward the reel; and a slide interposed between the cutter-bar and stop and serving to indicate when the proper adjustment of the stop has been effected to permit the tension of the spring to bring the reel knives and cutter-bar into contact at all points.

9. In a mower, the combination of a main frame; a knife reel carried thereby; a cutter-bar carrying frame pivotally supported in the main frame; a cutter-bar secured thereto; a spring secured at one end to said pivoted frame; adjusting means for the spring secured to the opposite end of the spring and to a fixed portion of the main frame; an indicator slide loosely mounted in the upper face of the pivoted frame; and an adjustable stop screw mounted in a fixed portion of the main frame, the lower end of said screw overlying the slide.

10. In a mower, the combination of a pair of side frames; a tie rod connecting said frames and about which said frames may have a relative movement; a knife reel mounted between said frames; a cutter-bar adapted to coact with the knives of the reel; and means, independent of the cutter-bar and tie rod, for securing the frames against relative movement when the bar and the reel knives are properly alined.

11. In a mower, the combination of a pair of side frames; a knife reel mounted between said frames; a cutter-bar adapted to coact therewith; and means, independent of the cutter-bar, for effecting a relative movement of the frames to aline the cutter-bar and reel knives and to secure said frames in such adjusted position.

In testimony whereof I have signed my name to this specification in the presence of two subscribing witnesses.

FRANK FARMER.

Witnesses:
   SWAN A. BRANDT,
   GEORGE WILLIAMS.